United States Patent [19]
Bueler

[11] 3,731,981
[45] May 8, 1973

[54] CONTROL VALVE AND SYSTEM
[75] Inventor: Richard C. Bueler, Des Pere, Mo.
[73] Assignee: Wagner Electric Corporation, Newark, N.J.
[22] Filed: May 21, 1971
[21] Appl. No.: 145,795

[52] U.S. Cl. .................................303/22 R, 303/6 C
[51] Int. Cl. .................................................B60t 8/18
[58] Field of Search .....................188/349; 60/545 E; 303/6 C, 22 R, 22 A

[56] References Cited

UNITED STATES PATENTS

| 3,649,084 | 3/1972 | Stelzer | 188/349 |
|---|---|---|---|
| 3,501,203 | 3/1970 | Falk | 303/22 A |
| 3,508,792 | 4/1970 | Bjeler | 188/349 |
| 3,659,420 | 5/1972 | Reinecke | 303/6 C |
| 3,395,537 | 8/1968 | Stelzer | 303/6 C |
| 3,169,800 | 2/1965 | Oberthur | 303/22 A |
| 3,269,782 | 8/1966 | Jolly | 303/22 R |

Primary Examiner—Duane A. Reger
Attorney—Joseph E. Papin

[57] ABSTRACT

A control valve for use in a vehicle load condition responsive brake system is provided having a pair of proportioning members connected in series flow relation between a fluid pressure source and a pressure responsive brake and also subjected to variable forces directly related to vehicle load conditions. The proportioning members are generally operable to perform proportioning operations on the fluid pressure selectively applied from the fluid pressure source to the brake and responsive to the variable forces for varying the magnitudes of the applied fluid pressure at which the proportioning operations occur.

46 Claims, 4 Drawing Figures

INVENTOR:
RICHARD C. BUELER
BY Joseph E. Papin

INVENTOR:
RICHARD C. BUELER
BY
Joseph E. Papin

CONTROL VALVE AND SYSTEM

This invention relates generally to vehicle load condition responsive brake systems and also to a control valve for use therein.

BACKGROUND OF THE INVENTION

In the past, various load proportioning valves have been utilized in vehicle brake systems and were generally operable in response to fluid pressure selectively supplied thereto from a fluid pressure source to effect the application of a brake energizing fluid pressure which was directly proportional to the load condition of the vehicle; however, one of the disadvantageous or undesirable features of such past proportioning valves and systems was that the brake energizing applied fluid pressure did not closely approach or approximate the theoritical or ideal braking pressure requirements. In other words, such past load proportioning valves were operable to effect an applied fluid pressure in only a single predetermined ratio subsequent to the supplied and applied fluid pressures attaining a "knee-point" which was directly related to the vehicle load conditions.

SUMMARY OF THE INVENTION

The principle object of the present invention is to provide a control valve and system which overcomes the aforementioned disadvantageous or undesirable feature of the past control valves and systems, and this, as well as other objects and advantageous features of the present invention, will become apparent hereinafter.

Briefly, the invention embodies a vehicle fluid pressure system and a control valve for use therein, said control valve being responsive to a force applied thereto related to the vehicle load conditions for performing a plurality of proportioning operations on fluid pressure applied from a source thereof in said system to at least one vehicle brake.

Figure 1:
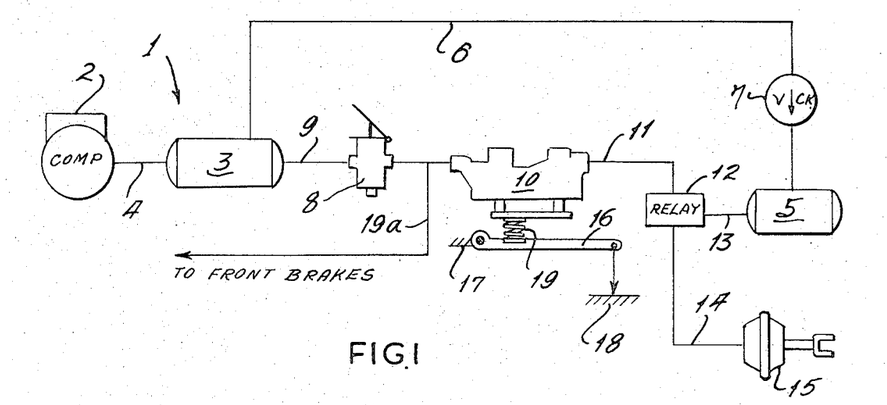
FIG. 1 is a schematic view of a fluid pressure system embodied in the present invention.

Referring now to the drawings in detail and in particular to FIG. 1, a vehicle load condition responsive brake system 1 is provided with fluid pressure generating means, such as the compressor 2, which is connected to a reservoir 3 by a conduit 4, and a protected reservoir 5 is connected with the reservoir 3 by a conduit 6 having a uni-directional flow valve or check valve 7 interposed therein. An application or foot valve 8 is interposed in a conduit 9 connected between the reservoir 3 and the inlet port of a control or load proportioning valve 10, and a conduit 11 is connected between the outlet port of said control valve and a relay valve 12 of a type well known in the art. Conduits 13, 14 connect the relay valve 12 between the reservoir 5 and a fluid pressure responsive motor 15 for energizing a vehicle brake (not shown). To complete the description of the system 1, a translating mechanism, such as a force applying lever or control arm 16, is pivotally connected between the vehicle sprung and unsprung masses, indicated generally at 17, 18, to translate the relative movement between said sprung and unsprung masses due to changing load conditions on the vehicle into a load force Fv which is directly related to the instantaneous vehicle load condition and transmits said force Fv to the control valve 10 through a resilient connection, such as the spring 19 interposed between said lever and control valve, and another conduit 19a to the vehicle front brakes (not shown) is connected with the conduit 11 between the application and control valves 8, 10.

Figure 2:
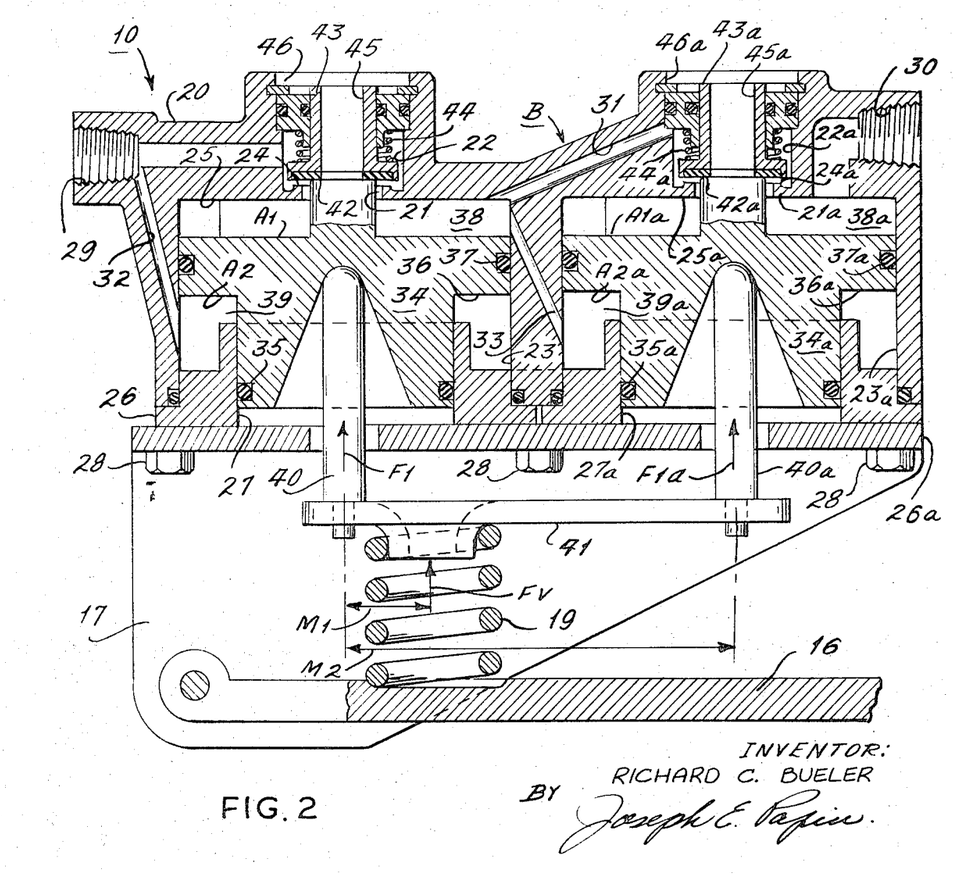
FIG. 2 is a section view illustrating the control valve of FIG. 1 also embodied in the present invention in cross-section.

The control valve 10, FIG. 2, is provided with a housing 20 having bores 21, 21a therein connected between opposed counterbores 22, 22a and 23, 23a, said counterbores 22, 22a defining inlet chambers, and valve seats 24, 24a are provided on said housing about said bores, respectively. Shoulders 25, 25a are defined on the housing 20 at the intersection of the bores 21, 21a and the counterbores 23, 23a, and closure members 26, 26a having bores 27, 27a therethrough are sealably connected with said housing adjacent to the open ends of the counterbores 23, 23a by suitable means, such as a plurality of studs 28. Inlet and outlet ports 29, 30, which receive conduits 9, 11, as previously mentioned, are provided in the housing 20 intersecting the counterbore 22 and intersecting the counterbore 23a adjacent to the shoulder 25a, respectively, and a passage 31 in said housing is connected between the counterbore 22a and the counterbore 23 adjacent to the shoulder 25. Connecting passages 32, 33 are provided in the housing 20 having one of their ends intersecting with the counterbores 23, 23a adjacent to the closure members 26, 26a and the other ends thereof connecting with the inlet port 29 and the passage 31, respectively.

Proportioning means or valve control members, such as stepped pistons 34, 34a, are slidably received in the closure member bores 27, 27a carrying peripheral seals 35, 35a in sealing engagement with said closure member bores, and radially extending flanges 36, 36a having peripheral seals 37, 37a therein are integrally provided on said pistons and slidably received in the housing counterbores 23, 23a, respectively. Outlet chambers 38, 38a are defined in the housing counterbores 23, 23a between the piston flanges 36, 36a and the housing shoulders 25, 25a, and control or differential chambers 39, 39a are also defined in said counterbores between said piston flanges and the closure members 26, 26a. The inlet and outlet ports 29, 30, bores 21, 21a, inlet and outlet chambers 22, 38 and 22a, 38a, and the passage 31 define a pressure fluid flow passage, indicated generally at B, through the housing 20. The pistons 34, 34a are drivingly engaged or connected with push rods 40, 40a having their exterior or lower ends interconnected by a force receiving plate, yoke or lever 41 which receives the force transmitting spring 19, as previously mentioned, and it should be noted that the distance or moment $M_1$ between said push rods is predeterminately proportional with and greater than the distance or moment $M_2$ between the push rod 34 and the load force Fv applied on the plate 41 by the spring 19.

The load force Fv acting on the pistons 34, 34a normally urge said pistons toward the housing shoulders 25, 25a, and integral extensions or valve seats 42, 42a on said piston extend coaxially through the housing bores 21, 21a into engagement with valve members 43, 43a normally displacing said valve members against their return springs 44, 44a from engagement with their cooperating housing valve seats 24, 24a, and the engagement between said valve members and the piston valve seats 42, 42a normally closes exhaust passages 45, 45a provided through said valve members. The open end portions of the housing bores 22, 22a define exhaust ports 46, 46a in the housing 20 in open pressure fluid communication with the valve member exhaust passages 45, 45a.

It should be noted that the pistons 34, 34a are provided with effective areas $A_1$, $A_{1a}$ defined between the sealing engagements of the seals 37, 37a with the housing counterbores 23, 23a and the sealing engagement of the piston valve seats 42, 42a with the valve members 43, 43a, and said areas $A_1$, $A_{1a}$ are subjected to the fluid pressures in the outlet chambers 38, 38a at all times. To complete the description of the control valve 10, effective areas $A_2$, $A_{2a}$ which are opposed to the areas $A_1$, $A_{1a}$ are also provided on the piston 34, 34a being defined between the sealing engagements of the seals 35, 35a and 37, 37a with the closure member bores 27, 27a and the housing counterbores 23, 23a, and said areas $A_2$, $A_{2a}$ are subjected to the fluid pressure in the control chambers 39, 39a, respectively.

In response to any instantaneous vehicle load conditions, the load force Fv acting on the plate 41 effects separate resulting forces $F_1$, $F_{1a}$ acting on the push rods 40, 40a, and since the moment $M_1$ is less than the moment $M_{1a}$, the force $F_1$ is predeterminately proportionally greater than the force $F_{1a}$; however, it is apparent that the proportional relationship between the resulting forces $F_1$, $F_{1a}$ can be altered merely be relocating the fulcrum point on the plate 41 at which the load force Fv is applied. With the component parts of the control valve 10 urged toward the positions shown in FIG. 2 and as described hereinbefore, operator actuation of the foot valve 8 meters a supplied or input fluid pressure P from the reservoir 3 through the conduit 9, the inlet port 29 of said control valve, the inlet and outlet chambers 22, 38, the passage 31, and inlet and outlet chambers 22a, 38a to establish an applied or output fluid pressure Po at the outlet port 30 which flows through the conduit 11 to the relay valve 12. The relay valve 12 is actuated in response to the outlet fluid pressure Po supplied thereto to establish a metered pressure fluid flow from the protected reservoir 5 through conduits 13, 14 to effect fluid pressure actuation of the motor 15 and the energization of the rear brakes (not shown). Of course, it is apparent that fluid pressure applied by the foot valve 8 also flows through the conduit 19a to effect energization of the front brakes (not shown) substantially simultaneously with the energization of the rear brakes.

Figure 3:
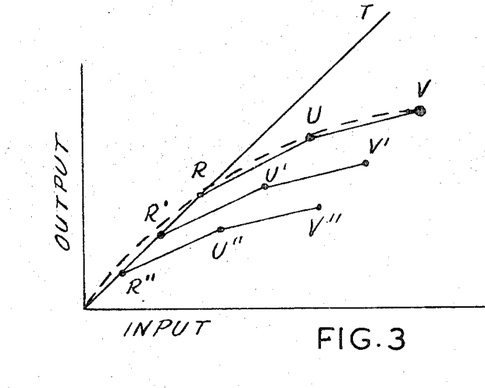
FIG. 3 is a graphical representation illustrating the input-output fluid pressures of the control valve of FIG. 1.

Referring now to FIG. 3, the input and output fluid pressures P, Po are substantially equal throughout the range OR as shown in the graph of FIG. 3, and when the input and output fluid pressures P, Po attain the value R, the force Po $A_{1a}$ of the output fluid pressure Po acting on the area $A_{1a}$ is effective to move the piston and valve member 34a, 43a to a lapped or isolating position engaging said valve member with its seat 24a against the opposing forces $F_{1a}$ and the additive force P $A_{2a}$ of the input fluid pressure P in the control chamber 39a acting on the area $A_{2a}$; therefore, with the piston and valve member 34a, 43a in their lapped positions, the housing bore 21a is closed isolating the input and output fluid pressures P, Po.

From the graphical representation in FIG. 3, it is obvious that a further increase in the magnitude of the input fluid pressure P in excess of the value R, as shown by the line ORT, will result in a proportionally reduced output fluid pressure Po as shown by the line RU. For instance, when the input fluid pressure P is increased in excess of the value R, the force $P A_{2a}$ is correspondingly increased and additive to the force $F_{1a}$ to overcome the opposing force Po $A_{1a}$; therefore, the piston 34a is moved upwardly toward a metering position disengaging the valve member 43a from the housing valve seat 24a to effect a metered application of the input fluid pressure P through the housing bore 21a and the outlet chamber 38a to effect a proportional increase of the output fluid pressure Po at the outlet port 30 in a predetermined ratio with the increased input fluid pressure P at the inlet port 29, as shown by the line RU in the graph of FIG. 3 wherein $Po = (F_{1a} + PA_{2a})/A_{1a}$. Of course, the increased output fluid pressure Po effects a corresponding increase in the force Po $A_{1a}$, and when the increased force Po $A_{1a}$ attains an increased value substantially equal to that of the increased force $P A_{2a}$ and the additive force $F_{1a}$, the piston and valve member 34a, 43a are again moved toward their lapped or isolating positions to re-engage said valve member with its valve seat 24a and again isolate the increased input and output fluid pressures P, Po. It is, of course, obvious that the piston 34a will be responsive to further increases in the input fluid pressure P to effect further corresponding proportionally increases in the output fluid pressure Po in the same manner as previously described.

The input fluid pressure P also acts on the effective areas $A_1$, $A_2$ of the piston 34 to establish opposed forces P $A_1$, P $A_2$, but the force $F_1$ which is additive to the force P $A_2$ and greater than the force $F_{1a}$ prevents movement of the piston and valve member 34, 43 until the output fluid pressure Po exceeds the value U. When the value U is attained, the force P $A_1$ overcomes the additive forces $F_1$, P $A_2$ to move the piston and valve member 34, 43 downwardly toward a lapped or isolating position engaging the valve member 43 with its cooperating valve seat 24 and isolating the input fluid pressure P in the inlet and outlet chambers 22, 38. For the sake of clarity, the fluid pressure in the outlet chamber 38 will hereinafter be referred to as the ratio input fluid pressure Pr which is, of course, present in the inlet and control chambers 22a, 39a acting on the area $A_{2a}$, as previously mentioned.

From the graph of FIG. 3, it is obvious that increases in the input fluid pressure P will result in further proportionally reduced increases in the ratio input fluid pressure Pr, as shown by the line UV. For instance, when the input fluid pressure P is increased to a value in excess of the value U, the input force $P\,A_2$ is correspondingly increased and additive to the force $F_1$ to overcome the opposing force $Pr\,A_2$; therefore, the piston 34 is moved upwardly toward a metering position disengaging the valve member 43 from the housing valve seat 24 to effect a metered application of the input fluid pressure P through the housing bore 21 to effect a proportional increase of the ratio input fluid pressure $Pr$ in the outlet chamber 38 in a predetermined ratio with the increased input fluid pressure P in the inlet chamber 22, as shown by the line UV in the graph of FIG. 3 wherein: $Pr = (F_1 + P\,A_2)/A_1$.

Of course, the increased ratio input fluid pressure $Pr$ effects a corresponding increase in the force $Pr\,A_1$, and when the increased force $Pr\,A_1$ attains an increased value substantially equal to that of the opposing increased force $P\,A_2$ and the additive load force $F_1$, the piston and valve member 34, 43 are again moved toward their lapped or isolating positions to reengage said valve member with its valve seat 24 and again isolate the input and ratio input fluid pressures P, $Pr$. It is obvious that the piston 34 will be responsive to further increases in the input fluid pressure P to effect further corresponding increases in the ratio input fluid pressure Pr in the same manner as previously described.

When the foot valve 8 is de-actuated, pressure fluid communication between the reservoir 3 and the control valve 10 through the conduit 9 and said foot valve is interrupted, and the inlet port 29 of said control valve is communicated or exhausted to the atmosphere through said foot valve; therefore, the input fluid pressure P is exhausted from the inlet chamber 22 through said inlet port and from the control chamber 39 through the passage 32 and said inlet port. The exhaustion of the input fluid pressure P eliminates the force $P\,A_2$ acting on the piston 34, and the opposing force $Pr\,A_1$ urges said piston downwardly against the force $F_1$ toward a position disengaging the piston valve seat 42 from the valve member 43 to open the exhaust passage 45 thereof. With the valve member exhaust passage 45 open the ratio input fluid pressure $Pr$ flows from the inlet and control chambers 22a, 39a through passages 31, 33, respectively, into the outlet chamber 38 and therefrom through the housing bore 21 and said valve member exhaust passage to the atmosphere. With the ratio input fluid pressure $Pr$ so exhausted, the forces $Pr\,A_1$ and $Pr\,A_{2a}$ respectively acting on the pistons 34, 34a are eliminated, and upon the elimination of the force $Pr\,A_1$, the opposing force $F_1$ moves the piston 34 upwardly toward its original position re-engaging the piston valve seat 43 with the valve member 43 closing the exhaust passage 45 and thereafter disengaging said valve member from the housing valve seat 24 against the negligible force of the valve spring 44. Upon the elimination of the force $Pr\,A_{2a}$ acting on the piston 34a, the opposing force $Po\,A_{1a}$ acting thereon urges said piston downwardly against the force $F_{1a}$ toward a position disengaging the piston valve seat 42a from the valve member 43a to open the exhaust passage 45a thereof. With the valve member exhaust passage 45a open, the output fluid pressure $Po$ flows from the relay valve 12 to effect de-actuation thereof through the conduit 11, the outlet port and chamber 30, 38a, the housing bore 21a and said valve member exhaust passage to the atmosphere. Of course, the exhaustion of the output fluid pressure $Po$ eliminates the force $Po\,A_{1a}$ acting on the piston 34a wherein the opposing force $F_{1a}$ moves said piston upwardly toward its original position re-engaging the piston valve seat 42a with the valve member 43a closing the exhaust passage 45a and thereafter disengaging said valve member from the housing valve seat 24a against the negligible force of the valve spring 44a. When the pistons 34, 34a and valve members 43, 43a are so returned to their original positions, the flow passage B is connected with the atmosphere through the conduit 9 and the de-actuated foot valve 8. When the relay valve 12 is de-actuated, as previously mentioned, the reservoir 5 is, of course, isolated, and the motor 15 is exhausted through the conduit 14 and said de-actuated relay valve to the atmosphere which de-energizes the rear brake (not shown).

From the foregoing description of the system 1 and control valve 10, it is apparent that the intensities of the load forces $F_1$, $F_{1a}$ acting on the proportioning members 34, 34a define the magnitude of the fluid pressure in the flow passage B at which the proportioning operations of said proportioning members occur, respectively; therefore, as the weight on the vehicle sprung mass 17 is altered, the translating mechanism 16 is actuated to correspondingly increase or reduce the load force Fv applied to the control valve 10 which, of course, effects a corresponding increase or reduction of the resulting forces $F_1$, $F_{1a}$. If, for instance, values or intensities of the load forces $F_1$, $F_{1a}$ acting on the proportioning members 34, 34a, are reduced, the magnitudes of the fluid pressure in the flow passage B at which the proportioning operations of said proportioning members occur are proportionally reduced corresponding to proportionally lighter instantaneous vehicle load conditions, as illustrated by the lines O R' U' V' and O R'' U'' V'' for instance. Furthermore, if the force $F_{1a}$ was made predeterminately greater than the force $F_1$ by changing the fulcrum point of the force Fv, as previously mentioned, it is obvious that the proportioning member 34 would be actuated to vary the fluid pressure immediately upstream thereof in response to the fluid pressure immediately downstream thereof in the flow passage B prior to the proportioning operation of the proportioning member 34a to vary the fluid pressure immediately upstream thereof in response to the fluid pressure immediately downstream thereof; however, such interchanging of the magnitudes of the forces $F_1$, $F_{1a}$ acting on said proportioning members will not affect the ultimate operation of the control valve 10, as illustrated by the graphical representation of FIG. 3.

Figure 4:
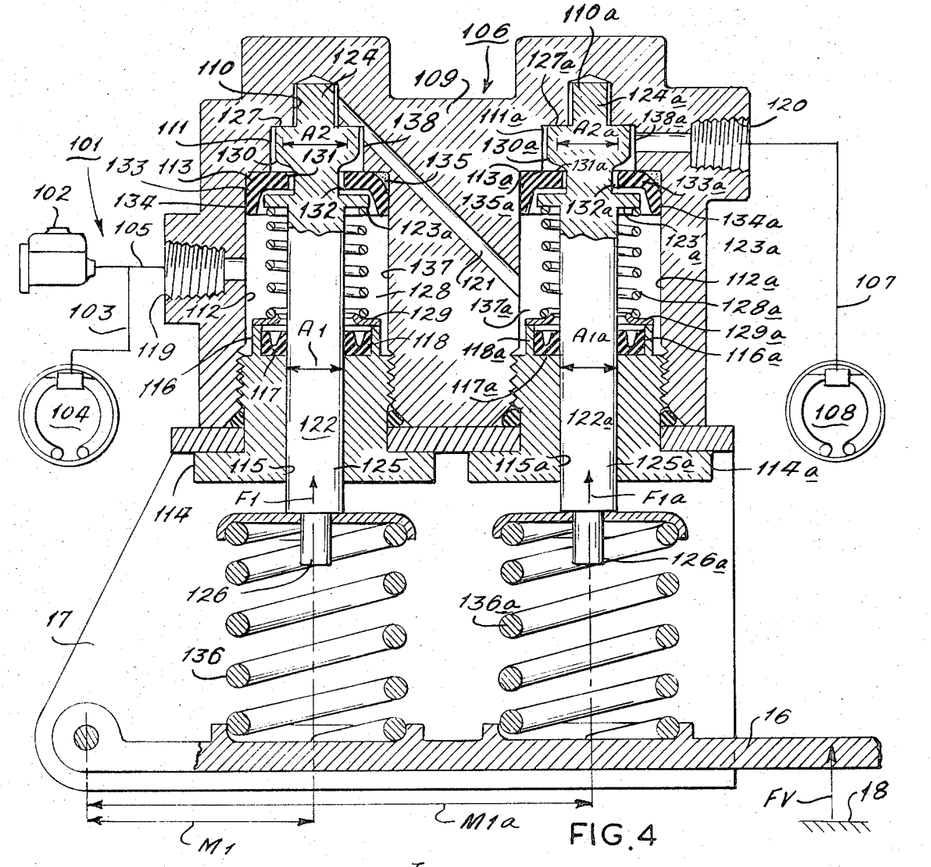
FIG. 4 is a schematic view of another fluid pressure system illustrating another control valve therein in cross-section and also embodied in the present invention.

Referring now to FIG. 4, another vehicle load condition responsive brake system 101 is provided with an operator actuated master cylinder 102 of a type well known in the art which is connected by a conduit 103 to the vehicle front brakes 104, and another conduit 105 is interconnected between the conduit 103 and the inlet port of a control or load proportioning valve 106. The outlet port of the control valve 106 is connected by a conduit 107 to the vehicle rear brakes 108.

The control valve 106 is provided with a housing 109 having stepped bores 110, 111 and 110a, 111a coaxially aligned therein with stepped counterbores 112, 112a, respectively. Shoulders or abutments 113, 113a are provided on the housing 109 between the bores and counterbores 111, 112 and 111a, 112a, and the housing counterbores 112, 112a are closed by closure members or end plugs 114, 114a threadedly received therein, said closure members being provided with stepped bores 115, 116 and 115a, 116a having shoulders 117, 117a therebetween, respectively. Annular seals 118, 118a are provided in sealing engagement with the closure member stepped bores 116, 116a and seated against the shoulders 117, 117a about the smaller stepped bores 115, 115a. An inlet port 119 which receives the conduit 105, as previously mentioned, is provided in the housing 109 intersecting with the housing counterbore 112 adjacent to the mid portion thereof, and an outlet port 120 which receives the conduit 107, as previously mentioned, is also provided in said housing intersecting with the housing stepped bore 111a. A connecting passage 121 is provided in the housing having one end connecting with the housing stepped bores 110, 111 while the other end thereof intersects with the housing counterbore 112a adjacent the mid portion thereof.

Modulating or proportioning members, such as the pistons indicated generally at 122, 122a are provided with head portions 123, 123a integrally formed between opposed reduced extensions or stem portions 124, 125 and 124a, 125a which are slidably and guidably received in the housing and closure member bores 110, 115 and 110a, 115a, respectively. The extensions 125, 125a extend through the closure member seals 118, 118a in sealing engagement therewith having force receiving or free end portions 126, 126a extending exteriorly of the closure members 114, 114a, and the head portions 123, 123a are provided with abutment portions 127, 127a for abutting engagement with the housing 109 to define the inoperative positions of the proportioning pistons 122, 122a. Return springs 128, 128a of negligible compressive force are provided between the proportioning piston head portions 123, 123a and retainers 129, 129a, normally urging said retainers into abutting engagement with the interior end portions of the closure members 114, 114a and urging the proportioning pistons 122, 122a toward their normal or inoperative positions engaging the abutment portions 127, 127a thereof with the end of the housing 109.

The proportioning pistons 122, 122a are provided with annular valve members 130, 130a which, in the inoperative positions of said proportioning pistons, are spaced from cooperating valve seats 131, 131a provided about apertures 132, 132a extending axially through seating members, indicated generally at 133, 133a. The seating members 133, 133a are normally positioned in seating engagement with the housing shoulders 113, 113a, and the seating member apertures 132, 132a are radially spaced from the periphery of the proportioning pistons 122, 122a, respectively. Peripheral lip portions 134, 134a are integrally provided on the seating members 133, 133a, normally in sealing engagement with the housing counterbores 112, 112a to close return flow passages 135, 135a provided in said lip portions across said seating members, respectively.

The control arm 16 which is pivotally connected between the vehicle sprung and unsprung masses 17, 18, as previously described, translates the relative movement between said sprung and unsprung masses due to changing load conditions on the vehicle into a load force Fv which is directly related to the instantaneous vehicle load condition and transmits said force Fv to the control valve 106 through separate resilient connections, such as the springs 136, 136a, which are connected with the exterior free end portions 126, 126a of the proportioning pistons 122, 122a, urging said proportioning pistons toward their inoperative positions.

A flow passage, indicated generally at C, is provided in the housing connecting the proportioning pistons 122, 122a in series flow relation between the inlet and outlet ports 119, 120, said flow passage being defined by said inlet port, the counterbore 112, the seating member aperture 132, the bore 111, the connecting passage 121, the counterbore 112a, the seating member aperture 132a, the bore 111a and said outlet port. Of course, it is apparent that the housing counterbores 112, 112a between the seating members 133, 133a and the closure members 114, 114a define inlet chambers 137, 137a in the housing 109, and the stepped bores 110, 111 and 110a, 111a define outlet chambers 138, 138a in said housing wherein the seating member apertures 132, 132a are interconnected between said inlet and outlet chambers 137, 138 and 137a, 138a, respectively. The inlet and outlet chambers 137, 138 are connected in pressure fluid communication with the inlet and outlet ports 119, 120 at all times, and the connecting passage 121 connects the inlet and outlet chamber 137a, 138 at all times.

It should be noted that the proportioning pistons 122, 122a are provided with substantially equal effective areas $A_1$, $A_{1a}$ defined by the sealing engagement of the proportioning piston extensions 125, 125a with the closure member seals 118, 118a and subjected to the atmosphere at all times, and the sealing engagement between the proportioning piston valve members 130, 130a and the seating member valve seat 131, 131a, as described hereinafter, define substantially equal effective areas $A_2$, $A_{2a}$ on said proportioning pistons which are subjected to the fluid pressure in the outlet chambers 138, 138a, respectively. The areas $A_2$, $A_{2a}$ are respectively predeterminately greater than the areas $A_1$, $A_{1a}$.

In response to any instantaneous vehicle load condition, the load force Fv acting on the springs 136, 136a effects separate resilient or resulting load forces $F_1$, $F_{1a}$ acting through said springs on the exterior end portions 126, 126a of the proportioning pistons 122, 122a, and since the moment $M_1$ is less than the moment $M_{1a}$, the load force $F_1$ is predeterminately proportionally greater than the load force $F_{1a}$; however, it is apparent that the proportional relationship between the load forces $F_1$, $F_{1a}$ can be altered merely by changing the moments $M_1$, $M_{1a}$ or by changing the rates of the springs 136, 136a. With the component parts of the control valve 106 urged toward the position shown in FIG. 4 and as described hereinbefore, operator actuation of the master cylinder 102 displaces a supplied or input fluid pressure P through the conduit 103 to energize the front brakes 104 and also through the conduit 105 and the flow passage C to establish an applied or output fluid pressure $Po$ in the outlet port 120 which flows through the conduit 107 to energize the rear brakes 108 substantially simultaneously with the energization of the front brakes 104.

Referring now to FIG. 3, the input and output fluid pressures $P$, $Po$ are substantially equal throughout the range OR, as shown in the graph of FIG. 3, and when the input and output fluid pressures $P$, $Po$ attain the value R, the output fluid pressures $Po$ acting on the effective area $A_1$ establishes a closing force $Po\ A_{1a}$ tending to urge the proportioning piston 122a against the load force $F_{1a}$ acting on the exterior free end 126a of said proportioning piston through the spring 136a. When the value R is attained, the closing force $Po\ A_{1a}$ overcomes the load force $F_{1a}$ to move the proportioning piston 122a downwardly from its inoperative position toward an isolating position engaging the valve member 130a thereof with the seating member valve seat 131a to close the seating member aperture 132a and isolate the input and output fluid pressures $P$, $Po$ in the inlet and outlet chamber 137a, 138a, and upon the engagement of said valve member with said valve seat, the input fluid pressure $P$ acts on the effective input area $A_{2a}-A_{1a}$ of said proportioning piston to establish an input force $P\ (A_{2a}-A_{1a})$ which is additive to the load force $F_{1a}$ to substantially balance the opposed output force $Po\ A_{2a}$ established by the output fluid pressure $Po$ acting on the effective output area $A_{2a}$ of said proportioning piston.

From the graphical representation in FIG. 3, it is obvious that a further increase in the magnitude of the input fluid pressure $P$ in excess of the value R, as shown by the line ORT, will result in proportionally reduced increases in the output fluid pressure $Po$, as shown by the line RU. For instance, when the input fluid pressure $P$ is increased to a value in excess of the value R, the input force $P\ (A_{2a}-A_{1a})$ is correspondingly increased and additive to the load force $F_{1a}$ to overcome the output force $Po\ A_{2a}$; therefore, the proportioning piston 122a is moved upwardly toward a metering position disengaging the valve member 130a thereof from the seating member valve seat 131a to effect a metered application of the input fluid pressure $P$ through the seating member aperture 132a to the outlet port 120 and effect a proportional increase in the output fluid pressure $Po$ in a predetermined ratio with the input fluid pressure $P$ at the inlet port 119, as shown by the line RU in the graph of FIG. 3 wherein $Po = [P\ (A_{2a}-A_{1a}) + F_{1a}]/A_{2a}$. Of course, the increased output fluid pressure $Po$ effects a corresponding increase in the output force $Po\ A_{2a}$, and when the increased output force $Po\ A_{2a}$ attains an increased value substantially equal to that of the increased input force $P\ (a_{2a}-A_{1a})$ and the additive load force $F_{1a}$, the proportioning piston 122a is again moved toward its isolating position re-engaging the valve member 130a thereof with the seating member valve seat 131a to again isolate the increased input fluid pressure $P$ and the increased output fluid pressure $Po$. It is, of course, obvious that the proportioning piston 122a will be responsive to further increases in the input fluid pressure $P$ to effect a further correspondingly proportional increase in the output fluid pressure $Po$ in the same manner as previously described.

The input fluid pressure $P$ also acts on the effective area $A_1$ of the proportioning piston 122 to establish another closing force $P\ A_1$ urging said proportioning piston against the load force $F_1$ acting on the exterior free end 126 of said proportioning piston through the spring 136; however, the load force $F_1$, which is greater than the load force $F_{1a}$, prevents movement of said proportioning piston until the output fluid pressure $Po$ exceeds the value U, as shown on the line RUV in the graph of FIG. 3. When the value U is attained, the closing force $P\ A_1$ overcomes the load force $F_1$ to move the proportioning piston 122 downwardly from its inoperative position toward an isolating position engaging the valve member 130 thereof with the seating member valve seat 131 to close the seating member aperture 132 and isolate the input fluid pressure $P$ in the inlet and outlet chambers 137, 138. For the sake of clarity, the fluid pressure in the outlet chamber 138 will hereinafter be referred to as the ratio input fluid pressure $Pr$, which is, of course, present in the connecting passage 121 and the inlet chamber 137a acting on the input area $A_{2a}-A_{1a}$ of the proportioning piston 122a, as previously mentioned. Upon the engagement of the valve member 130 with the valve seat 131, the input fluid pressure $P$ acts on the effective input area $A_2-A_1$ of the proportioning piston 122 to establish an input force $P\ (A_2-A_1)$ which is additive to the load force $F_1$ to substantially balance the opposed output force $Pr\ A_2$ established by the ratio input fluid pressure $Pr$ acting on the effective output area $A_2$ of said proportioning piston.

From the graphical representation in FIG. 3, it is obvious that a further increase in the magnitude of the input fluid pressure $P$ will result in further proportionally reduced increases in the ratio input fluid pressure $Pr$, as shown by the line UV. For instance, when the input fluid pressure $P$ is so increased, the input force $P\ (A_2-A_1)$ is correspondingly increased and additive to the load force $F_1$ to overcome the opposing force $Pr\ A_2$; therefore, the proportioning piston 122 is moved upwardly toward a metering position disengaging the valve member 130 thereof from the seating member valve seat 131 to effect a metered application of the input fluid pressure $P$ through the seating member aperture 133 to the outlet chamber 138 to effect a proportional increase in the ratio input fluid pressure $Pr$ in the outlet chamber 138 in a predetermined ratio with the increased input fluid pressure $P$ in the inlet chamber 137, as shown by the line UV in the graph of FIG. 3, wherein $Pr = [P\ (A_2-A_1) + F_1]/A_2$. Of course, the increased ratio input fluid pressure $Pr$ effects a corresponding increase in the force $Pr\ A_2$, and when the increased force $Pr\ A_2$ attains an increased value substantially equal to that of the opposing increased input force $P\ (A_2-A_1)$ and the additive load force $F_1$, the proportioning piston 122 is again moved toward its isolating position re-engaging the valve member 130 thereof with the seating member valve seat 131 to again isolate the input fluid pressure and ratio input fluid pressure $P$, $Pr$. It is obvious that the proportioning piston 122 will be responsive to further increases in the input fluid pressure $P$ to effect further corresponding increases in the ratio input fluid pressure $Pr$ in the same manner as previously described.

When the master cylinder 102 is de-actuated, the input fluid pressure P is vented to the atmosphere which effects de-energization of the front brakes 104 and eliminates the input force $P (A_2-A_1)$ acting on the proportioning piston 122. Upon the elimination of the input force $P (A_2-A_1)$, the ratio input fluid pressure Pr acting on the seating member 133 displaces the sealing lip 134 thereof from sealing engagement with the housing counterbore 112 to open the return flow passages 135 across said seating member, and in this manner, the ratio input fluid pressure Pr returns from the inlet chamber 137a through the connecting passage 121, the outlet chamber 138, the inlet chamber 137, the inlet port 119 and conduits 105, 103 to the master cylinder 102. When the ratio input fluid pressure Pr is so reduced to correspondingly reduce the output force Pr $A_2$ to a value less than that of the load force $F_1$, the spring 136 moves the proportioning piston 122 upwardly to its original or inoperative position re-engaging the abutment portion 127 thereof with the housing 109 and disengaging the valve member 130 thereof from the seating member valve seat 131 to again open the seating member aperture 132 re-establishing open pressure fluid communication therethrough between the inlet and outlet chambers 137, 138 to effect complete elimination of the ratio input fluid pressure Pr. While the ratio input fluid pressure Pr is being reduced to effect the complete reduction of the output force Pr $A_2$ on the proportioning piston 122 as described hereinabove, it is apparent that such reduction of the ratio input fluid pressure Pr also effects a simultaneous corresponding reduction of the input force Pr $(A_{2a}-A_{1a})$ acting on the proportioning piston 122a, and upon the elimination of the input force Pr $(A_{2a}-_{1a})$, the output fluid pressure Po acting on the seating member 133a displaces the sealing lip 134a thereof from the sealing engagement with the housing counterbore 112a to open the seating member return flow passage 135a. In this manner, the output fluid pressure Po returns from the rear brake 108 through the conduit 7, the outlet port 120, the outlet chamber 138 and therefrom to the master cylinder 2, as previously described. When the fluid pressure Po is further reduced to correspondingly reduce the output force Po $A_{2a}$ to a value less than the load force $F_{1a}$, the spring 136a moves the proportioning piston 122a upwardly to its original or inoperative position re-engaging the abutment portion 127a thereof with the housing 109 and disengaging the valve member 130a thereof from the seating member valve seat 131a to again open the seating member aperture 132a and re-establish open pressure fluid communication between the inlet and outlet ports 119, 120 through the flow passage C to effect the complete elimination of the output fluid pressure Po.

From the foregoing description of the system 101 and control valve 106, it is apparent that the intensities of the load force $F_1$, $F_{1a}$ acting on the proportioning members 122, 122a define the magnitude of the fluid pressure in the flow passage C at which the proportioning operations of said proportioning members occur, respectively; therefore, as the weight on the vehicle sprung mass 17 is altered, the translating mechanism 16 is actuated to correspondingly reduce or increase the resulting load force $F_1$, $F_{1a}$. If, for instance, values or intensities of the force $F_1$, $F_{1a}$ acting on the proportioning members 122, 122a, are reduced, the magnitude of the fluid pressure in the flow passage C at which the proportioning operations of said proportioning members occur are propor-tionally reduced corresponding to the proportionally lighter instantaneous vehicle load conditions, as illustrated by the lines OR′ U′ V′ and OR″ U″ V″, for instance. Furthermore, if the load force $F_{1a}$ was made predeterminately greater than the force $F_1$, it is obvious that the proportioning member 122 would be actuated to vary the fluid pressure immediately upstream thereof in response to the fluid pressure immediately downstream thereof in the flow passage C prior to the proportioning operation of the proportioning member 122 to vary the fluid pressure immediately upstream thereof in response to the fluid pressure immediately downstream thereof; however, such interchanging of the magnitudes of the forces $F_1$, $F_{1a}$ acting on said proportioning members will not affect the ultimate operation of the control valve 106, as illustrated in the graphical representation of FIG. 3.

The embodiments of the invention in which an exclusive property or privilege is claimed are defined as follows:

1. A control valve for a vehicle load condition responsive brake system comprising a housing, a pair of proportioning members movable in said housing in series flow relation and defining with said housing a pressure fluid flow passage therethrough, said proportioning members being operable generally to perform proportioning operations on the fluid pressure in said flow passage, respectively, and means engaged with said proportioning members and transmitting thereto separate instantaneous forces each of which is proportionally related to the instantaneous load condition of the vehicle to define the instantaneous magnitudes of the fluid pressure at which the proportioning operations of said proportioning members occur in a constant ratio, respectively.

2. A control valve for a vehicle load condition responsive brake system comprising a housing having a pressure fluid flow passage therethrough, a pair of proportioning members movable in said flow passage in series flow relation for performing proportioning operations on the fluid pressure therein, said proportioning members being operable generally in response to fluid pressure in said flow passage upstream thereof in excess of first and second instantaneous values to vary the fluid pressure downstream thereof in said flow passage, respectively, and means engaged with said proportioning members and transmitting thereto separate instantaneous forces each of which is proportionally related to the instantaneous load condition of the vehicle to define the magnitudes of said first and second instantaneous values in a constant ratio, respectively.

3. A control valve for a vehicle load condition responsive brake system comprising a housing having a pressure fluid flow passage therethrough, a pair of proportioning members movable in said housing in series flow relation for performing proportioning operations on the fluid pressure in said flow passage, said proportioning members being initially movable in response to fluid pressure acting thereon of one and other instantaneous values toward positions isolating the fluid pressure upstream thereof from that downstream thereof in said flow passage and being further movable in response to increases in the fluid pressure upstream thereof toward metering positions effecting metered increases in the fluid pressure downstream thereof in one and other predetermined ratios with the increased fluid pressure upstream thereof, respectively, and means engaged with said proportioning members for transmitting thereto separate instantaneous load forces each of which is proportionally related to the instantaneous load condition of the vehicle to define the instantaneous magnitudes of the one and other instantaneous values in constant ratio, respectively.

4. A control valve according to claim 3, wherein said proportioning members include a pair of proportioning pistons movable in said housing, said proportioning pistons being movable against their load forces toward their isolating positions and said load forces assisting movement of said proportioning pistons toward their metering positions, respectively.

5. A control valve according to claim 4, comprising a pair of valve seats in said housing about said flow passage for engagement with said proportioning pistons, said valve seats being engaged by said proportioning pistons in their isolating positions and said proportioning pistons being disengaged from said valve seats in their metering positions, respectively.

6. A control valve according to claim 5, comprising a pair of valve means on said proportioning pistons for engagement with said valve seats, said valve seats being engaged by said valve means when said proportioning pistons are in their isolating positions and disengaged therefrom when said proportioning pistons are in their metering positions, respectively.

7. A control valve for a vehicle load condition responsive brake system comprising a housing having a pressure fluid flow passage therethrough, a pair of valve means movable in series flow relation in said flow passage for controlling pressure fluid flow therethrough, a pair of valve control means movable in said housing for respective engagement with said valve means, one of said valve control means and valve means being concertedly movable in response to fluid pressure in said flow passage immediately upstream thereof in excess of one and other instantaneous values toward positions in said flow passage to vary the fluid pressure therein immediately downstream thereof, respectively, and means engaged with said one and other valve control means for transmitting thereto separate instantaneous load forces each of which is proportionally related to the instantaneous load condition of the vehicle to define the magnitudes of the one and other instantaneous values in a constant ratio, respectively.

8. A control valve according to claim 7, comprising first and second pairs of opposed areas on said one and other valve control means subjected to the fluid pressures in said flow passage upstream and downstream of said one and other valve means, said load forces being additive to the upstream fluid pressures acting on one of the areas of said first and second area pairs in opposition to the downstream fluid pressures acting on the other of the areas of said first and second area pairs to urge said one and other valve control means and valve means toward their fluid pressure varying positions, respectively.

9. A control valve according to claim 8, wherein said other areas of said first and second area pairs are predeterminately greater than said one areas of said first and second area pairs, respectively.

10. A control valve according to claim 8, comprising a pair of valve seats on said housing about said flow passage for engagement with said valve means, respectively, said valve means being urged toward engagement with said valve seats to isolate the fluid pressures upstream and downstream thereof when the downstream fluid pressures of the first and second instantaneous values acting on said other areas of said first and second area pairs are substantially equal to the upstream fluid pressures in excess of said first and second values acting on said one areas of said first and second area pairs and the additive load forces, and said valve means being moved by said valve control means to their fluid pressure varying positions disengaged from said valve seats when the additive load forces and the upstream fluid pressures in excess of the first and second instantaneous values acting on said other areas of said first and second area pairs exceed the downstream fluid pressures in excess of the first and second instantaneous values acting on said one area of said first and second area pairs, respectively.

11. A control valve according to claim 10, wherein said valve control means include a pair of piston means movable in said housing, extension means on said piston means for engagement with said valve means, radially extending flange means on said piston means, and each of said flange means having opposed sides respectively subjected to the fluid pressures upstream and downstream of said valve control means, one of the sides of said flange means defining said one areas of said first and second area pairs, and said other areas of said first and second area pairs being defined on the other sides of said flange means, respectively.

12. A control valve for a vehicle load condition responsive brake system comprising a housing having inlet and outlet ports therein, a pair of valve means movable in said housing in series flow relation for controlling pressure fluid communication between said inlet and outlet ports, passage means in said housing for the passage of fluid pressure between said valve means, a pair of valve control means movable in said housing for engagement with said valve means, one of said valve control means and valve means being concertedly movable in response to fluid pressure at said inlet and outlet ports in excess of a first instantaneous value to effect metered pressure fluid communication between said inlet and outlet ports and establish a proportionally reduced fluid pressure at said outlet port, the other of said valve control means and valve means being concertedly movable in response to one of the fluid pressures at said passage means and at said inlet port in excess of a second instantaneous value greater than said first instantaneous value to effect metered pressure fluid communication between one of said inlet and outlet ports and said passage means and establish another proportionally reduced fluid pressure at one of said outlet port and said passage means, respectively, and means engaged with said valve control means for transmitting thereto separate instantaneous load forces each of which is proportionally related to the instantaneous load condition of the vehicle to define the magnitudes of the first and second instantaneous values in a constant ratio.

13. A control valve according to claim 12, comprising first and second opposed areas on each of said one and other valve control means subjected to the fluid pressure at one of said inlet port and passage means and to the fluid pressure at one of said passage means and outlet port, respectively, said load forces being additive to the fluid pressure at one of said inlet port and passage means acting on said first areas of said one and other valve control means, respectively.

14. A control valve according to claim 13, wherein said second areas of said one and other valve control means are predeterminately greater than said first areas thereof.

15. A control valve according to claim 12, comprising a pair of valve seats on said housing between said inlet and outlet ports for engagement with said valve means, the load forces normally urging said valve control means into engagement with said valve means and displacing said valve means from said valve seats, said one and other valve control means and valve means being initially movable in response to fluid pressure at said inlet and outlet ports of the first instantaneous value and to the fluid pressure at said passage means and one of said inlet and outlet ports of the second instantaneous value toward isolating positions engaging said valve means with said valve seats, respectively, and said one and other valve control means and valve means being thereafter movable to their metering positions disengaging said valve means from said valve seats, respectively.

16. A control valve according to claim 12, comprising a pair of valve seats on said housing between said inlet and outlet ports for engagement with said valve means, the load forces normally urging said valve control means into engagement with said valve means and disengaging said valve means from said valve seats, first and second opposed areas on each of said one and other valve control means subjected to the fluid pressure at one of said inlet port and passage means and to the fluid pressure at one of said passage means and outlet port, respectively, said one valve control means and valve means being movable in response to the fluid pressure at one of said outlet port and passage means of the first instantaneous value acting on said second area of said one valve control means against the fluid pressures at one of said inlet port and passage means acting on said first area of said one valve control means and one of the additive load forces acting thereon toward an isolating position engaging said one valve means with one of said valve seats to interrupt pressure fluid communication between said passage means and one of said inlet and outlet ports, said other valve control means and valve means being movable in response to the fluid pressure at the other of said outlet port and passage means of the second instantaneous value acting on said second area of said other valve control means against the fluid pressure at the other of said inlet port and passage means acting on said first area of said other valve control means and the other of the additive load forces acting thereon toward an isolating position engaging said other valve means with the other of said valve seats to interrupt pressure fluid communication between said passage means and the other of said inlet and outlet ports, and said one and other valve control means and valve means being further movable to their metering positions disengaging said one and other valve means from said one and other valve seats upon the increase of the fluid pressures at said one and other of said inlet port and passage means acting on said first areas of said one and other valve control means, respectively.

17. A control valve according to claim 16, wherein said one and other valve control means include a pair of stepped pistons movable in said housing each having opposed sides, one of the opposed sides being subjected to the atmosphere, a pair of extension means on the other opposed sides of said pistons for respective engagement with said valve means, a pair of flange means integral with said pistons and each having opposed sides, said first areas of said one and other valve control means being on one of said flange means opposed sides, respectively, and said second areas of said one and other valve control means being on the other of said piston opposed sides and the other of said flange means opposed sides, respectively.

18. A control valve for a vehicle load condition responsive brake system comprising a housing having a pair of sets of inlet and outlet chambers therein, passage means in said housing connected in series flow relation between the inlet chamber of one of said chamber sets and the outlet chamber of the other of said chamber sets, a pair of proportioning members movable in said housing and operable generally to perform proportioning operations on the fluid pressure flowing from the inlet chambers to the outlet chambers of said one and other chamber sets, respectively, and means for discerning changes in the instantaneous vehicle load condition including means engaged with said proportioning means and transmitting thereto separate instantaneous load forces proportionally related to the instantaneous load condition of the vehicle to define the instantaneous magnitudes of the fluid pressure at which the proportioning operations of said proportioning members occur in a constant ratio, respectively.

19. A control valve for a vehicle load condition responsive brake system comprising a housing having a pair of sets of inlet and outlet chambers therein, passage means in said housing connected in series flow relation between the inlet chamber of one of said chamber sets and the outlet chamber of the other of said chamber sets, a pair of valve means movable in the inlet chambers of said chamber sets for controlling pressure fluid communication between the chambers of said chamber sets, respectively, a pair of valve control means movable in the outlet chambers of said chamber sets for engagement with said valve means, respectively, one and the other of said valve control means and valve means being movable in response to fluid pressures in said inlet chambers of said one and other chamber sets in excess of one and other instantaneous values toward metering positions effecting metered pressure fluid communication between the inlet and outlet chambers of said one and other chamber sets proportional to that in the inlet chambers thereof, respectively, and means for discerning changes in the instantaneous vehicle load condition including means engaged with said one and other valve control means and transmitting thereto separate instantaneous load forces proportional to the instantaneous load condition of the vehicle to define the magnitudes of the one and other instantaneous values in a constant ratio, respectively.

20. A control valve according to claim 19, comprising first and second pairs of opposed areas on said valve control means subjected to the fluid pressures in the inlet and outlet chambers of said one and other chamber sets, respectively, said load forces being additive to the fluid pressures in the inlet chambers of said one and other chamber sets acting on one area of said first and second area pairs in opposition to the fluid pressures in the outlet chambers of said one and other chamber sets acting on the other of the areas of said first and second area pairs, respectively.

21. A control valve according to claim 20, wherein said other area of said first and second area pairs are respectively greater than said one areas thereof.

22. A control valve according to claim 19, comprising a pair of valve seats on said housing between the inlet and outlet chambers of said one and other chamber sets for engagement with said valve means, respectively, said valve means being disengaged from said valve seats upon the movement of said one and other valve control means and valve means toward their metering positions.

23. A control valve according to claim 20, comprising a pair of valve seats on said housing between the inlet and outlet chambers of said one and other chamber sets, respectively, said valve means being urged toward engagement with said valve seats when the fluid pressures in the outlet chambers of said one and other chamber sets in excess of the one and other instantaneous values acting on said other areas of said first and second area pairs are substantially equal to the fluid pressures in the inlet chambers of said one and other chamber sets acting on said one areas of said first and second area pairs and the additive load forces, and said valve means being disengaged from said valve seats upon the movement of said one and other valve control means and valve means toward their metering positions.

24. A control valve according to claim 23, wherein said one and other valve control means define with said housing a pair of control chambers opposed to the outlet chambers of said one and other chamber sets, said one areas of said first and second area pairs being subjected to the fluid pressures in said control chambers, and a pair of passages in said housing connecting said control chambers in pressure fluid communication with the inlet chambers of said one and other chamber sets, respectively.

25. A control valve according to claim 24, wherein said valve control means include a pair of stepped pistons movable in said housing between said control chambers and the outlet chambers of said one and other chamber sets, respectively, said pistons each having opposed sides, one of said opposed sides of said piston means being subjected to the atmosphere, a pair of extension means on the other of said opposed sides of said piston means for respective engagement with said valve means, a pair of flange means integral with said piston means and each having opposed portions subjected to the fluid pressures in said control chambers and the outlet chambers of said one and other chamber sets, respectively, said one areas of said first and second area pairs being on one of the opposed portions of said flange means in said control chambers, and said other areas of said first and second area pairs being on the other of said opposed portions of said flange means and the other of said piston means opposed sides in the outlet chambers of said one and other chamber sets, respectively.

26. A load condition responsive brake system for a vehicle comprising at least one fluid pressure responsive brake, and a pair of proportioning valve means connected in said system in series flow relation and operable generally to perform proportioning operations on fluid pressure applied to said brake to effect energization thereof including means for applying separate instantaneous load forces proportionally related to the instantaneous load conditions of the vehicle to said proportioning valve means for defining in a constant ratio the instantaneous magnitudes of the applied fluid pressure at which the proportioning operations occur, respectively.

27. A load condition responsive brake system for a vehicle comprising at least one fluid pressure responsive brake, means for applying fluid pressure to effect energization of said brake, and control means connected in series flow relation between said first named means and brake including a pair of means operable generally in response to separate instantaneous magnitudes of the applied fluid pressure to perform proportioning operations thereon, respectively, and other means for applying to said included means pair separate instantaneous load forces responsive to varying load conditions of the vehicle for varying in a constant ratio the magnitudes of the applied fluid pressure at which the proportioning operations of said included means pair occur, respectively.

28. A load condition responsive brake system for a vehicle comprising at least one fluid pressure responsive brake, means for applying fluid pressure to said brake to effect energization thereof, control means connected between said first named means and said brake including a pair of proportioning members in series flow relation and operable generally in response to one and other instantaneous magnitudes of the applied fluid pressure to perform proportioning operations thereon, respectively, and means for discerning changes in the load condition of said vehicle including means for transmitting to said proportioning members separate instantaneous load forces proportionally related to the instantaneous load condition of the vehicle to define in a predetermined constant ratio the one and other instantaneous magnitudes of the applied fluid pressure at which the proportioning operations of said proportioning members occur.

29. A load condition responsive brake system according to claim 28, wherein said control means includes a housing having a pressure fluid flow passage therethrough connected between said applying means and said brake, said proportioning members being movable in said flow passage in series flow relation for performing the proportioning operations on the applied fluid pressure therein.

30. A load condition responsive brake system according to claim 28, wherein said proportioning members include a pair of valve means movable in series flow relation in said flow passage for controlling the flow of the applied fluid pressure therethrough, and a pair of valve control means movable in said housing for respective engagement with said valve means, one and the other of said valve control means and valve means being movable in response to applied fluid pressure upstream thereof in excess of the one and other instantaneous magnitudes toward metering positions in said flow passage to vary the applied fluid pressure therein immediately downstream of said one and other valve members, said load force transmitting means being engaged with said valve control means, respectively.

31. A load condition responsive brake system according to claim 30, comprising first and second pairs of opposed areas on said one and other valve control means subjected to the applied fluid pressure in said flow passage upstream and downstream of said one and other valve means, respectively, said load forces being additive to the upstream applied fluid pressures acting on one of the areas of said first and second area pairs in opposition to the downstream applied fluid pressures acting on the other of said areas of said first and second area pairs to urge said one and other valve control means and valve means to their metering positions, respectively.

32. A load condition responsive brake system according to claim 31, wherein other areas of said first and second area pairs are predeterminately greater than said one areas thereof, respectively.

33. A load condition responsive brake system according to claim 30, comprising a pair of valve seats on said housing about said flow passage for engagement with said valve means, said valve means being disengaged from said valve seats upon the movement of said one and other valve control means and valve means toward their metering positions.

34. A load condition responsive brake system according to claim 30, wherein said valve control means define with said housing a pair of chambers, said one areas of said first and second area pairs being in said chambers, and a pair of passage means in said housing connected between said chambers and said flow passage on the upstream sides of said valve means, respectively.

35. A load condition responsive brake system according to claim 31, comprising a pair of valve seats on said housing about said flow passage for engagement with said valve means, respectively, said valve means being urged toward engagement with said valve seats to isolate the upstream and downstream applied fluid pressures when the downstream applied fluid pressures in excess of the one and other instantaneous magnitudes acting on said other areas of said first and second area pairs are substantially equal to the upstream applied fluid pressures in excess of the one and other instantaneous magnitudes acting on said one areas of said first and second area pairs and the additive load forces, and said valve means being moved by said valve control means toward their metering positions disengaged from said valve seats when the additive load forces and the upstream applied fluid pressures in excess of the one and other instantaneous magnitudes acting on said one areas of said first and second area pairs exceed the downstream applied fluid pressures in excess of the one and other instantaneous magnitudes acting on said other areas of said first and second area pairs, respectively.

36. A load condition responsive brake system according to claim 35, wherein said valve control means define with said housing a pair of chambers, said one areas of said first and second area pairs being within said chambers, respectively, passage means connected between one of said chambers and said flow passage upstream of said one valve means, and other passage means having one end connected with the other of said chambers and the other end thereof connected with said flow passage downstream of said one valve means and upstream of said other valve means.

37. A control valve according to claim 1, wherein said means includes a lever pivotally movable about its fulcrum in response to changes in the vehicle instantaneous load condition, and a pair of springs respectively engaged between said proportioning members and lever and predeterminately spaced from the lever fulcrum for transmitting the separate instantaneous forces.

38. A control valve according to claim 1, wherein said means include a lever pivotally movable about its fulcrum in response to changes in the vehicle instantaneous load condition, a yoke member drivingly connected between said proportioning members, and a spring engaged between said lever and yoke member, the engagement of said spring with said yoke member being predeterminately spaced between the connection of said yoke member with each of said proportioning members.

39. A control valve according to claim 2, wherein said means includes a lever pivotally movable about its fulcrum in response to changes in the vehicle instantaneous load condition, and a pair of springs respectively engaged between said proportioning members and lever and predeterminately spaced from the lever fulcrum for transmitting the separate instantaneous forces.

40. A control valve according to claim 2, wherein said means include a lever pivotally movable about its fulcrum in response to changes in the vehicle instantaneous load conditions, a yoke member drivingly connected between said proportioning members, and a spring engaged between said lever and yoke member, the engagement of said spring with said yoke member being predeterminately spaced between the connection of said yoke member with each of said proportioning members.

41. A control valve according to claim 7, wherein said last named means includes a lever pivotally movable about its fulcrum in response to changes in the vehicle instantaneous load conditions, a yoke member connected between said valve control means, and a spring connected between said lever and yoke member, the connection of said spring with said yoke member being predeterminately spaced between the connections of said yoke member with said valve control means.

42. A control valve according to claim 18, wherein said included means includes a lever pivotally movable about its fulcrum in response to change in the vehicle instantaneous load condition, and a pair of springs respectively engaged between said proportioning members and lever and predeterminately spaced from the lever fulcrum for transmitting the separate instantaneous forces.

43. A control valve according to claim 18, wherein said included means includes a lever pivotally movable about its fulcrum in response to changes in the vehicle instantaneous load conditions, a yoke member drivingly connected between said proportioning members, and a spring engaged between said lever and yoke member, the engagement of said spring with said yoke member being predeterminately spaced between the connection of said yoke member with each of said proportioning members.

44. A load condition responsive brake system according to claim 26, wherein said included means includes lever means pivotally movable about its fulcrum in response to changes in the vehicle instantaneous load conditions, and a pair of resilient means predeterminately spaced from said lever means fulcrum and connected in force transmitting engagement between said lever means and said proportioning valve means, respectively.

45. A load condition responsive brake system according to claim 26, wherein said included means includes lever means pivotally movable about its fulcrum in response to changes in the vehicle instantaneous load condition, other means connected between said proportioning valve means in force transmitting engagement therewith, respectively, and resilient means connected between said lever means and other means, the connection of said resilient means with said other means being predeterminately spaced between the respective connections of said other means with said proportioning valve means.

46. A load condition responsive brake system according to claim 35, wherein said included means includes a lever pivotally movable about its fulcrum in response to changes in the vehicle instantaneous load condition, a pair of spaced push rods drivingly engaged with said valve control means, respectively, a yoke connected between said push rods in force transmitting engagement therewith, respectively, and a spring connected in biasing engagement between said yoke and lever, the connection of said spring with said yoke being predeterminately spaced between the connections of said yoke with said push rods.

* * * * *

UNITED STATES PATENT OFFICE
CERTIFICATE OF CORRECTION

Patent No. 3,731,981      Dated: May 8, 1973

Richard C. Bueler

It is certified that errors appear in the above-identified Letters Patent which is hereby corrected as shown below:

Column 5, line 1, after "is" insert -- so --; same line, including "to" delete down to and including "U" in line 2; line 52, "43" should read -- 42 --. Column 9, line 54, "P $(a_{2a} - A_{1a})$" should read -- P $(A_{2a} - A_{1a})$ --. Column 12, line 5, "propor-tionally" should read -- proportionally --. Column 13, line 12, after "in" insert -- a --; line 42, after "means" insert -- and the other of said valve control means and valve means --.

Signed and sealed this 22nd day of January 1974.

(SEAL)
Attest:

EDWARD M. FLETCHER, JR.
Attesting Officer

RENE D. TEGTMEYER
Acting Commissioner of Patents